United States Patent
Danovitz et al.

(10) Patent No.: US 10,803,854 B1
(45) Date of Patent: Oct. 13, 2020

(54) UTTERANCE REQUEST OF ITEMS AS SEEN WITHIN VIDEO

(71) Applicant: Amazon Technologies, Inc., Seattle, WA (US)

(72) Inventors: Joshua Danovitz, Seattle, WA (US); Lei Li, Kirkland, WA (US); Lars Christian Ulness, Seattle, WA (US); Andrew J. Watts, Seattle, WA (US); Amarsingh Buckthasingh Winston, Seattle, WA (US); Umut Utkan, Seattle, WA (US); Michael Flynn, Seattle, WA (US); Girish Bansilal Bajaj, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

(21) Appl. No.: 16/017,849

(22) Filed: Jun. 25, 2018

(51) Int. Cl.
| | | |
|---|---|---|
| *G10L 15/08* | | (2006.01) |
| *G06K 9/00* | | (2006.01) |
| *G06F 3/16* | | (2006.01) |
| *G06Q 30/02* | | (2012.01) |
| *G06F 16/907* | | (2019.01) |

(52) U.S. Cl.
CPC .............. *G10L 15/08* (2013.01); *G06F 3/167* (2013.01); *G06F 16/907* (2019.01); *G06K 9/00718* (2013.01); *G06Q 30/0269* (2013.01); *G06Q 30/0277* (2013.01)

(58) Field of Classification Search
USPC .................... 704/231, 246, 247, 251, 252
See application file for complete search history.

(56) References Cited

U.S. PATENT DOCUMENTS

| 2012/0232968 | A1* | 9/2012 | Calman .............. G06Q 30/0207 |
| | | | 705/14.4 |
| 2014/0249817 | A1* | 9/2014 | Hart ........................ G10L 15/22 |
| | | | 704/239 |
| 2017/0200162 | A1* | 7/2017 | Pourfallah ......... G06Q 20/3276 |
| 2017/0243581 | A1* | 8/2017 | Mozer ..................... G10L 15/25 |

OTHER PUBLICATIONS

Gartenberg, Chaim, "How to shop on Amazon using Alexa voice controls," The Verge, Website, Published Jul. 10, 2017, Downloaded Nov. 25, 2019, <https://www.theverge.com/2017/7/10/15947672/amazon-alexa-voice-controls-shopping-prime-echo-how-to>, 5 pages.

\* cited by examiner

*Primary Examiner* — Leonard Saint Cyr
(74) *Attorney, Agent, or Firm* — Weaver Austin Villeneuve & Sampson LLP

(57) ABSTRACT

Techniques are described for fulfilling an utterance request for an item represented within a video rendered at a client device. In some implementations, a user account associated with the request is identified, enabling a video stream transmitted in association with the user account at the time that the request was uttered to be identified. In one technique, a timestamp associated with the request is used to identify the relevant portion of the video stream. The item represented within the portion of the video stream can be identified using various techniques and/or information such as image recognition, metadata within the video, subtitles, closed captions, and/or a database mapping between the item and a video content item transmitted in the video stream.

20 Claims, 6 Drawing Sheets

UTTERANCE REQUEST OF ITEMS AS SEEN WITHIN VIDEO

BACKGROUND

A number of voice services offer voice technology including speech recognition and natural language processing. Typically, a voice service offers a list of commands that can be uttered by individuals and recognized by the voice service. A device that integrates the voice technology is generally used to access these voice services.

Currently, some of the voice services offer the ability to order items using voice commands. To order an item, a subscriber must utter a command such as "order" and specifically identify the item being ordered. Therefore, the subscriber must have knowledge of the name of the item and details such as color, manufacturer, brand, etc.

In some instances, the voice service cannot identify the desired item based upon the description provided by the subscriber. This can occur when the item is not available or the description of the item is not sufficiently accurate. The subscriber must then provide a different description, select an item from options provided by the voice service, order the item from a website associated with the voice service, or obtain the item from another source. As a result, the ordering process can be time-consuming and cumbersome.

DETAILED DESCRIPTION

This disclosure describes techniques that facilitate the use of a single voice command to order (e.g., purchase) an item seen within a video. The voice command indicates a request to submit an order but does not identify a specific item being ordered. The voice command is processed using voice technology, recognized, and interpreted as a request to submit an order in relation to an item seen within a video at or approximately at the time that the voice command was uttered by the user. A particular video and a specific item shown within the particular video at or around the time that the voice command was uttered may be identified in real-time. An order for the identified item may be fulfilled and the user's account may be updated accordingly. An example will be described in further detail below.

A number of streaming media services enable multimedia such as movies, television programs, and live media content to be streamed to client devices. Media content is sent as a continuous stream over the Internet and played as it arrives. Video streaming is a type of media streaming that enables video data to be viewed without being downloaded on a client device.

While watching a video, a user's interest may be peaked by an item represented within the video. For example, the product may be a physical product, a digital product, or a service. In some instances, the user may decide to purchase the item. To purchase the item, the user would typically need to travel to a brick-and-mortar store, order the item from a store website, or call a store to order the item. Therefore, the user would typically need to expend a significant amount of effort to locate and purchase the item.

As will be described in further detail below, a user may order an item that they see within a video by uttering a simple command such as "Buy it." Since the command is short and simple, the user may utter a voice command without significant effort or disruption while watching the video. In addition, since the command does not identify the item being ordered, a user may order an item seen within a video without requiring the user to know and provide details pertaining to the item such as name, manufacturer, brand, etc. The ability to order an item by uttering a simple command in relation to visual information also enables a user with a limited vocabulary to order items that they cannot accurately describe. Furthermore, since the user can order the item immediately, the user need not expend effort to write down information pertaining to the item and need not be concerned that they will forget to order the item.

Figure 1:
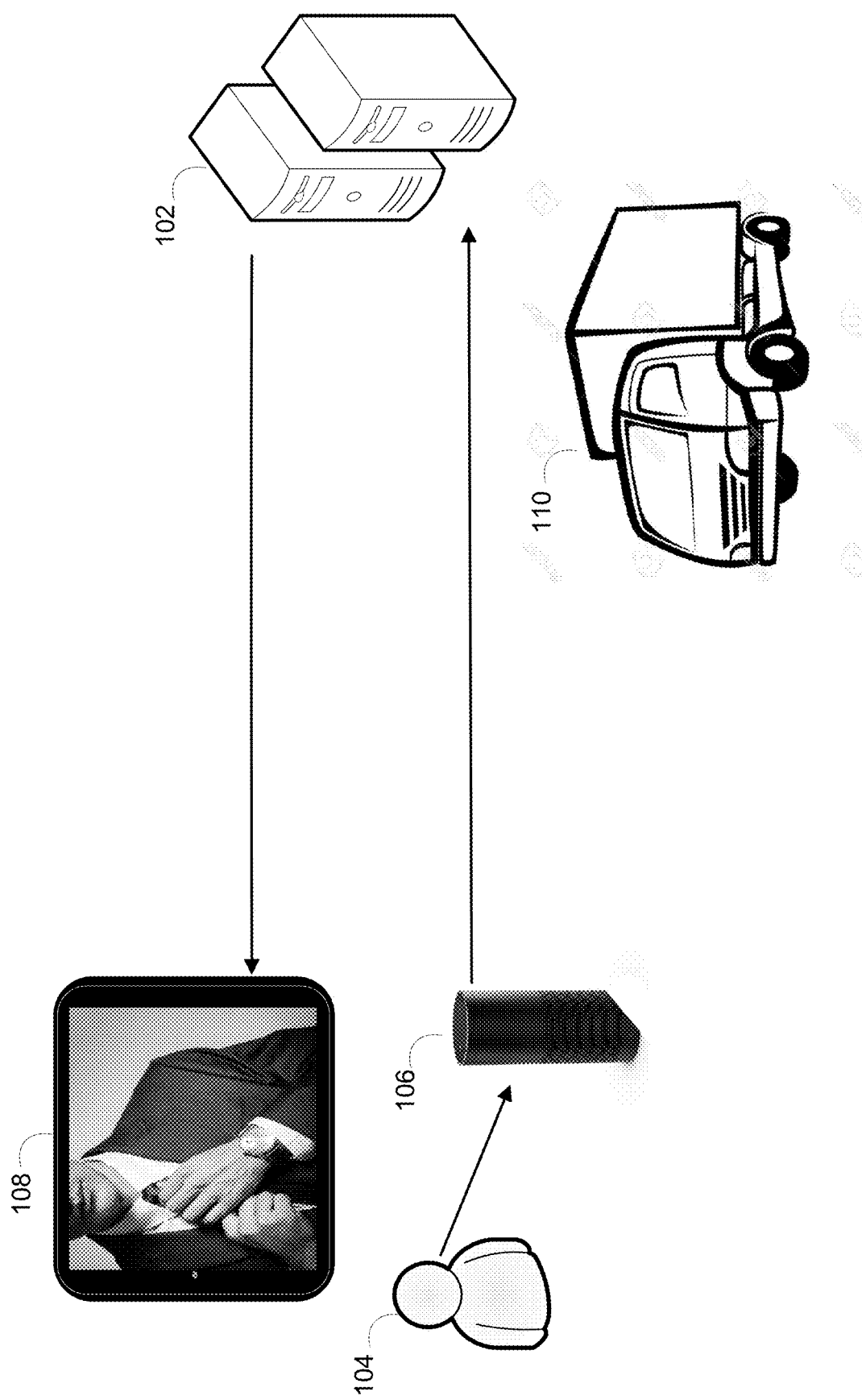
FIG. 1 is a simplified diagram illustrating an example of a particular implementation.

FIG. 1 illustrates an example of an application of a particular implementation. Computing system 102 provides a voice service such as Alexa™ Voice Service that offers a list of commands that can be uttered by individuals and recognized by the voice service. In addition, computing system 102 provides a media streaming service and an ordering service, which may be associated with an online store accessible via a corresponding website. To access the voice service, user 104 registers (e.g., via the website) a first client device 106 that integrates voice technology with the voice service of computing system 102. First client device 106 is a computing device that includes a microphone, a speaker, a processor, and a memory that stores software configured to communicate with the voice service. For example, first client device 106 can include a device such as an Amazon Echo™, Echo Dot™, Amazon Tap™, Echo Show™, Echo Spot™, Echo Plus™, Dash Wand™, Amazon Fire TV™, or a compatible Fire Tablet device, each of which is available from Amazon.com, Inc.

Computing system 102 stores account information pertaining to a user account associated with user 104. The account information can include login information such as a username and password, personal information of user 104 such as a name and address, device registration information including client identifiers of client devices that have registered with or logged into computing system 102, and/or information pertaining to transactions completed by user 104 in association with services such as the voice service, media streaming service(s) including a video content service, and/or the ordering service. Transactions can include, for example, orders, media streaming events, successful login events, etc.

User 104 logs in to the user account via first client device 106 and a second client device 108, and selects a movie, "Indiana Jones," from the media streaming service using second client device 108. Computing system 102 streams the movie to second client device 108, which renders the movie in real-time. While first client device 106 and second client device 108 are shown in this example as being two different devices, first client device 106 and second client device 108 may be the same client device. For example, a single client device such as an Echo Show™ may communicate with the voice service and render video content obtained from the media streaming service.

User 104 notices a man wearing an attractive watch in the movie and decides to purchase the watch. User 104 utters a command "Buy it," which is captured by first client device 106 and processed by the voice service of computing system 102. The voice service interprets the command, "Buy it," as pertaining to an item represented within video content being viewed by the user. Computing system 102 identifies the user account associated with first client device 106 from which the voice command was received and ascertains, from account information associated with the user account, which video content is being streamed in association with the user account. In this example, computing system 102 determines that the movie "Indiana Jones" is being streamed to second client device 108 associated with the user account.

Computing system 102 then ascertains which item represented within the movie is being requested. In this example, computing system 12 determines that at the time that the command was uttered by the user, the watch was being shown on a display of or associated with second client device 108. Computing system 102 stores a record of an order for the watch in association with the user account and processes the order. The following day, a delivery truck 110 delivers the watch to the home address of user 104.

Figure 2:
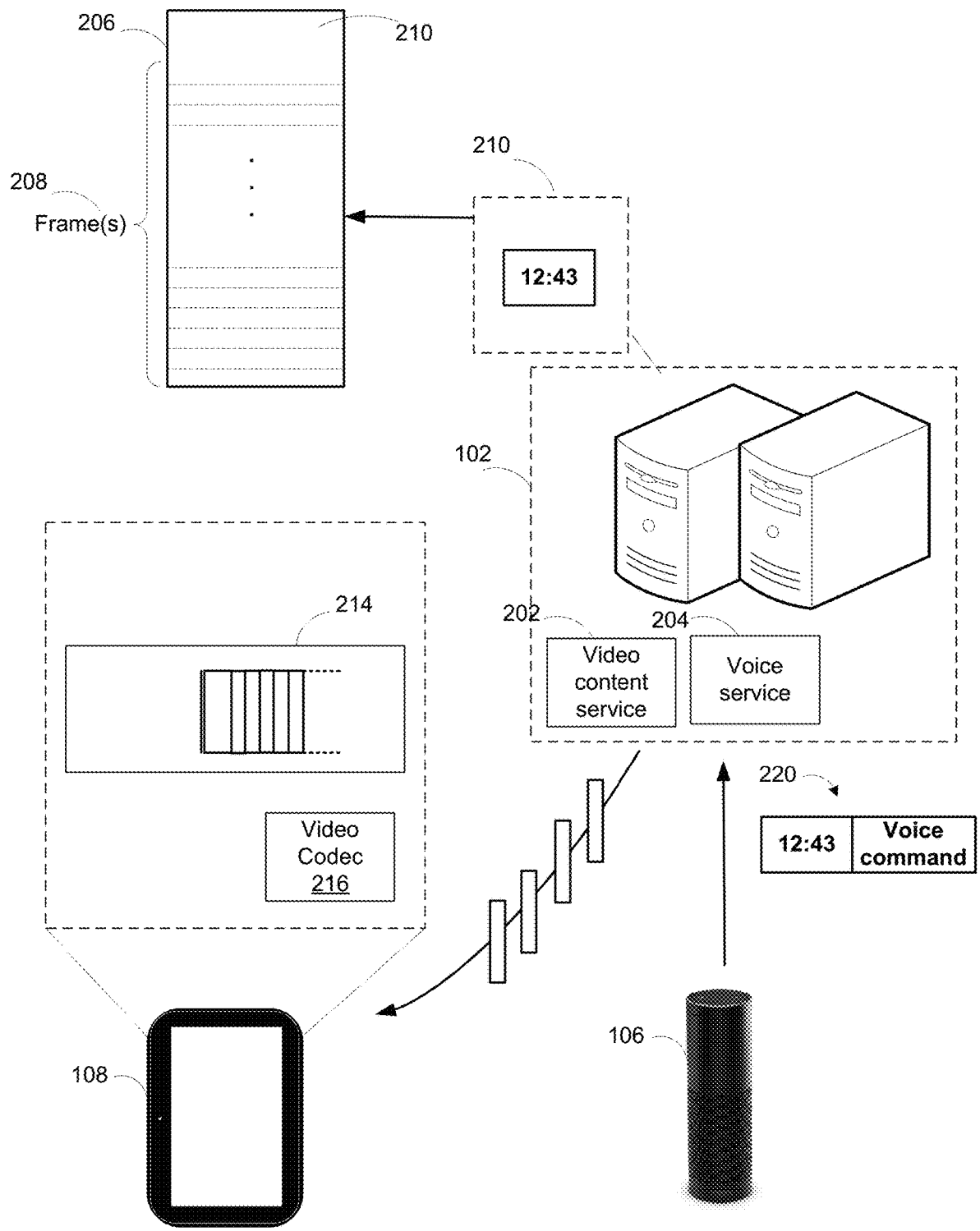
FIG. 2 is a simplified diagram illustrating an example of an application of a particular implementation.

FIG. 2 is a simplified diagram illustrating an example of an application of a particular implementation. In the example illustrated in FIG. 2, a user of client device 108 logs in to their user account and browses a catalogue of video titles available from video content service 202 of computing system 102. When the user selects the category, "Television Shows" and the sub-category "Comedies" to view television shows that are identified as comedies within content service 202, content service 202 queries its catalogue and identifies 53 television shows that are comedies. The user uses client device 108 to select "Seinfeld" from the catalogue and then selects "Season 3, Episode 1."

Content service 202 maintains files associated with the video titles available from content service 202. In this example, content service 202 identifies a subset of the files that are relevant to the selected episode. Each file 206 is a video file that includes frames 208 that have been encoded by a video codec.

As shown in FIG. 2, each file 206 can include a header 210 including metadata pertaining to frames 208 of file 206. Frames 208 can be encoded within separate fragments corresponding to different segments of time. Each file 206 can conform to a digital multimedia container format such as MPEG-4 Part 14 or MP4. In accordance with various implementations, header 210 or selected frame(s) 208 are encoded with a tag that indicates that an item represented within video content of file 206 can be purchased from computing system 102 using a voice command. In some implementations, header 210 or selected frame(s) 208 are encoded with indicator information configured to provide an audio or visual prompt that indicates that an item within the video can be ordered using a voice command.

In one implementation, content service 202 provides identified file(s) by transmitting the identified file(s) to client device 108. In another implementation, content service 202 provides information pertaining to the fragments of the identified video file(s) to client device 108. For example, content service 202 may provide a manifest file that includes information indicating how to access the fragments. For example, the information may indicate locations (e.g., URLs and/or byte offsets) at which the fragments can be accessed.

Client device 108 can use the information to retrieve the video fragments. Client device 108 may save the video fragments and/or other files received from content service 202 in memory 214 (or buffer).

A demultiplexer of client device 108 demultiplexes the frames and passes the frames to a decoder. In the implementation depicted in FIG. 2, the frames are passed to video codec 216, which decodes the frames and renders the video in real-time on a display that is integral with or coupled to client device 108.

As the user watches the Seinfeld episode using client device 108, the user sees Seinfeld wearing a particular hat. A visual prompt indicates that the hat can be purchased using a single voice command. The user utters a voice command "Buy it," which is captured by microphone of client device 106, which integrates voice technology with a voice service 204 offered by computing system 102. Since client device 106 is registered with voice service 204 using the user account, it is possible to link voice commands with video content being streamed in association with the user account.

Voice service 204 and/or client device 106 may be configured with technology that converts an utterance to text. For example, voice service 204 and/or client device 106 may be configured with software that performs speech recognition and natural language processing to convert a voice command (e.g., item request) to text. Voice service 204 and/or client device 106 may also be configured to parse and process the text to identify the voice command and any associated parameters. Therefore, client device 106 may send a message 220 that includes an unprocessed utterance (e.g., audio stream) or includes results of processing the utterance to voice service 204.

A body of message 220 includes or otherwise identifies a command that can be processed by voice service 204. More particularly, message 220 can include a voice command, a text command, an identifier of a command, and/or parameter(s) of a command. Parameters can indicate information pertaining to an item shown within the video such as a category of the item that the user intends to buy and/or a time that the item was represented within the video. For example, the user may utter the phrase "Buy the watch from 10 minutes ago" or "Buy the watch." A header of message 220 can include information such as an identifier of client device 106 from which the command was received, a timestamp, and/or location information indicating a location of client device 106.

Voice service 204 receives message 220 including or otherwise identifying the voice command and recognizes the voice command as pertaining to video content being viewed using another client device associated with the user account. Voice service may obtain information from the header and/or body of message 220, as described herein.

Computing system 102 determines, from account information associated with the user account, which video content is being streamed in association with the user account. In this example, computing system 102 determines that "Seinfeld: Season 3, Episode 1" is being streamed to client device 108 associated with the user account. In instances where multiple devices associated with the user account are streaming video, computing system 102 can determine which of the devices is closest to client device 106 via which the voice command was received. This can be determined, for example, using Internet Protocol (IP) addresses or locations of the devices.

Since the voice command does not identify a particular item being ordered, computing system 102 can use information external to the voice command to identify a particular item, represented within the video, to which the user request pertains. In some implementations, computing system 102 uses a timestamp 210 associated with the voice command to identify the item represented within frame(s) of the episode at the time that the user command was uttered. In this example, computing system 102 determines that the voice command was uttered at 12:43 and ascertains that at 12:43, a hat represented within the video was rendered by client device 108. Various techniques for identifying a particular item being requested in association with a voice command that does not identify the particular item will be described in further detail below.

Voice service 204 of computing system 102 can request confirmation from the user that they would like to purchase a black bowler hat manufactured by Hats International. The user confirms their intent to purchase the bowler hat and computing system 102 updates the user account to reflect the purchase. Computing system 102 submits an order for the hat and ships the hat to the user at their home address, as indicated in the user account.

While the examples described above pertain to the purchasing of items, these examples are merely illustrative. In other implementations, a user command may request an item that is not associated with a purchase. For example, the user may utter the command "watch next episode" to add the next episode of "Seinfeld" to their video queue without specifically selecting the next episode via the video content service.

Figure 3:
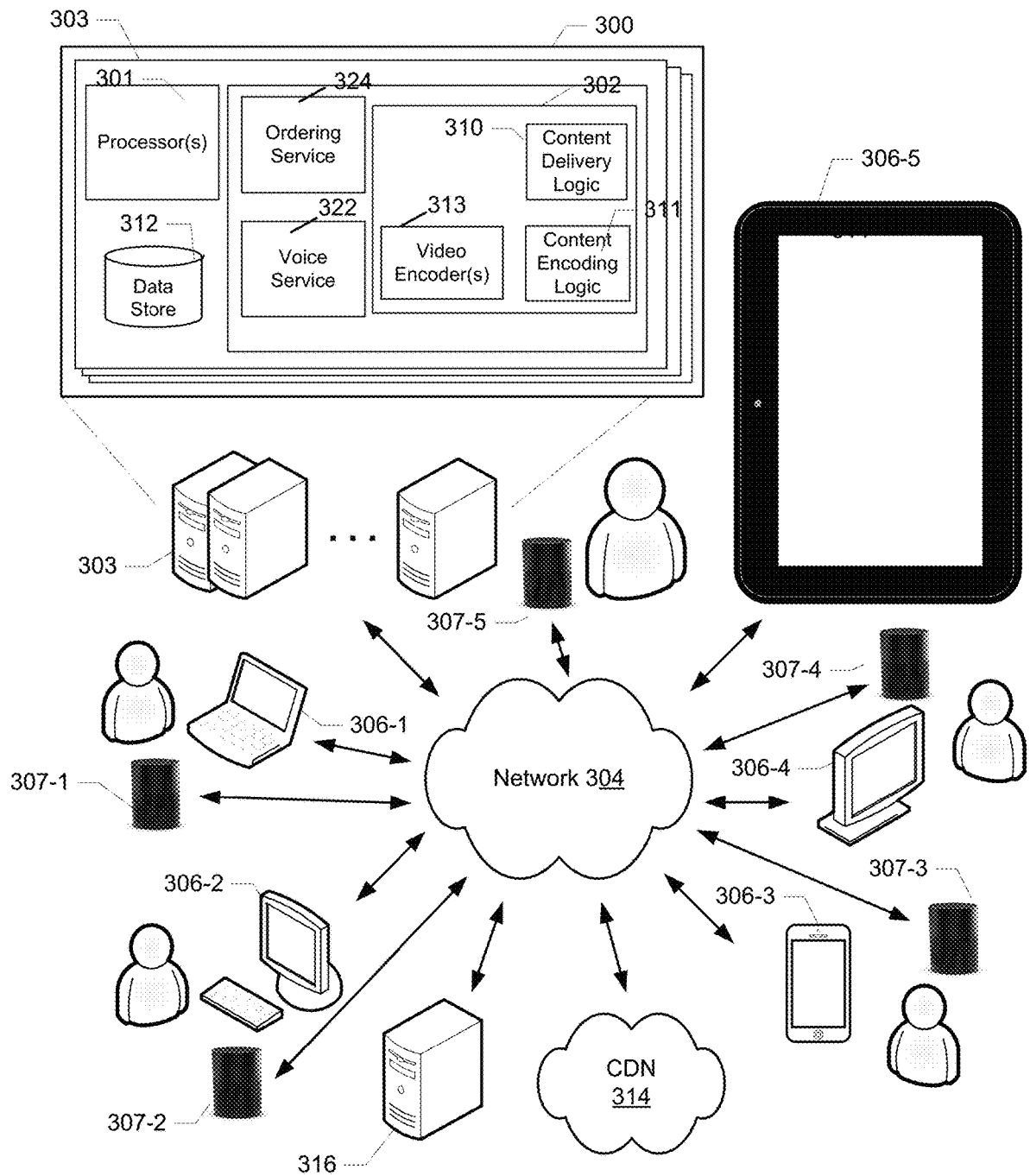
FIG. 3 is a simplified diagram of a computing environment in which various implementations may be practiced.

FIG. 3 is a simplified diagram of a computing environment in which various implementations may be practiced. As shown in FIG. 3, computing system 300 including processor(s) 301 and data store(s) 312 offers a variety of services to client devices via network(s) 304. More particularly, computing system 300 offers a media content service 302 that provides content via network 304 to a variety of client devices (306-1 through 306-5). Content service 302 includes content delivery logic 310 which facilitates various aspects of content delivery to client devices 306. In one implementation, the content may include media content such as video-on-demand (VOD) content (e.g., audio or video), live content, or recorded content.

In addition, computing system 300 offers a voice service 322 such as Alexa™ via network 304 to client devices (307-1 through 307-5) that integrate voice technology with voice service 322, as described herein. Voice service 322 supports a list of commands (e.g., voice commands) that it recognizes. The list of commands that are recognized by voice service 322 may be stored in data store 312. More particularly, each command within the list of commands may be mapped, within data store 312, to a set of computer-readable instructions that are executed in response to receiving the corresponding command. Sets of computer-readable instructions mapped to some of these commands are executed independently from content delivered by content service 302 to client devices 306. In some implementations, sets of computer-readable instructions mapped to a subset of the commands are executed within the context of video content delivered by content service 302 to client devices. For example, a command within the subset of the commands may include a phrase such as "Buy it" or "I want that," which may indicate that a user is requesting an item that they see or have recently seen in a video delivered by content service 302. Ordering service 324 may execute a set of computer-readable instructions that facilitates fulfillment of the voice command, as will be described in further detail below. In some implementations, ordering service 324 is associated with a corresponding website that enables users to locate and order (e.g., purchase) items that are available from ordering service 324. Ordering service 324 may include video-voice command mapping logic that enables an item within a video to be identified and ordered (e.g., purchased) in response to a single voice command that does not identify the item.

Ordering service 324 may be configured to communicate with or may be integrated with content service 302 and/or voice service 322. Communication with content service 302 and/or voice service 322 may be uni-directional or bi-directional. For example, communication with content service 302 may be uni-directional such that ordering service 324 obtains information from content service 202, while communication with voice service 322 may be bi-directional.

Data store(s) 312 may store user account information pertaining to user accounts maintained by computing system 300. The account information can include an account identifier (e.g., customer identifier), login information such as a username and password, personal information associated with user 104, device registration information including client identifiers of client devices that have registered with computing system 300 or services offered by computing system 300, client identifiers of client devices that have/are currently logged in to the user account, and information pertaining to transactions completed by user 104 in association with voice service 322, media streaming services including content service 302, and/or ordering service 324. Information pertaining to completed transactions or other account information can be explicitly specified by a user or may be obtained by computing system 300 based upon various interactions by client devices with computing system 300 or associated services.

Personal information associated with a user such as a name, mailing address, electronic mail address, billing address, default payment method, and/or credit card information such as credit card number and expiration date. The personal information can also include information explicitly provided by the user, as well as information implicitly obtained by computing system 300 based upon prior user online activity.

Account information maintained in data store(s) 312 in association with voice service transactions can include a timestamp associated with a voice command that has been received by the voice service, the voice command or associated text derived or generated from the voice command, an identifier associated with the voice command or associated text, an identifier of the client device from which the voice command was received, and/or information indicating a location of the client device such as an IP address or Global Positioning System (GPS) coordinates. The timestamp may be obtained from an audio stream including the voice command or may be associated with a time that the voice command was received by voice service 322.

Similarly, account information maintained in data store(s) 312 in association with content service transactions can include an identifier of the video stream, an identifier of a content item transmitted within the video stream, an identifier of a fragment of the content item transmitted within the video stream, timestamp(s) associated with transmission of the video stream or fragment thereof, timestamp(s) associated with request(s) for the video stream or fragment thereof, an identifier of a client device to which the video stream is transmitted, and/or information indicating a location of the client device such as an IP address or GPS coordinates.

Services including content service 302, voice service 322, and ordering service 324 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, cloud-based networks, the Internet, the World Wide Web, intranets, extranets, etc.

Client devices 306 may be any suitable device capable of connecting to network 304 and downloading or consuming streams of live and/or VOD content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches or smart glasses), etc. Client devices 307 may be a device integrated with voice service 322 and include hardware and/or software configured to connect to network 304, capture voice commands, and communicate with voice service 322, which may respond to voice commands and facilitate fulfillment of voice commands. Such devices may include, for example, an Amazon Echo™, Echo Dot™, Amazon Tap™, Echo Show™, Echo Spot™, Echo Plus™, Dash Wand™, Amazon Fire TV™, or a compatible Fire Tablet device, each of which is available from Amazon.com, Inc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling services such as content service 302, voice service 322, and/or ordering service 324, as shown in FIG. 3. Alternatively, such resources may be independent of services such as content service 302, voice service 322, and/or ordering service 324, e.g., on a platform under control of a separate provider of computing resources with which these services connect to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 314) that may or may not be independent of content service 302. In addition, the source of the content may or may not be independent of content service 302 (e.g., as represented by content provider server 316).

Implementations enabled by the present disclosure contemplate logic and video codec(s) resident on the client devices 306 consuming content from content service 302; such logic and video codec(s) being configured to decode video files generated as described herein and display the resulting video content. The logic might be part of an existing algorithm or module on the client device or implemented to work in conjunction with such an algorithm or module. The logic might be implemented, for example, in a media player on the client device, as a browser plug-in, or as a separate application or module resident on the client device. Implementations are also contemplated in which, in addition to content delivery logic 310 (which facilitates various aspects of content delivery to client devices 306), content service 302 may include logic that facilitates at least some aspects of the delivery of content as described herein (e.g., as represented by content encoding logic 311). For example, encoding logic 311 might encode digital video content corresponding to media content titles according to a particular video encoding standard or multiple encoding standards. Encoding logic 311 can apply video encoder(s) 313, where each video encoder 313 operates according to a different video encoding standard. Each video encoder can be implemented in software and/or hardware.

In some implementations, encoding logic 311 encodes digital video content such that a header or payload of the digital video content includes a tag indicating that an item represented within the video content can be ordered from computing system 300 using a voice command. The tag may be encoded at a particular point within the video content at which the item is represented within the video content. For example, the tag may be encoded within metadata, closed captions, or subtitles of the video content. In some implementations, encoding logic 311 may encode the digital video content with information configured to generate a visual or audio prompt that indicates that an item represented within the video content can be ordered using a voice command.

A visual or audio prompt indicating that an item represented within the video content can be ordered using a voice command can be provided automatically in the absence of a user prompt. Alternatively, the visual or audio prompt can be provided in response to a voice command or other engagement with voice service 322. A visual or audio prompt can be provided using client device 306 via which the video content is rendered, client device 307 communicatively coupled to voice service 322, and/or another client device associated with the user account such as a smart phone, a television, or another device configured to communicate with voice service 322. For example, a visual prompt can be transmitted via a text message to the user's smart phone.

In addition to providing access to content, content service 302 may also include a variety of information related to the content (e.g., associated metadata, web documents, manifests, and/or executable files) in data store 312 to which service 302 provides access. Alternatively, such information about the content, as well as the content itself may be provided and/or hosted by one or more separate platforms, e.g., CDN 314. It should be noted that, while logic 310 and 311, and video encoder 313 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
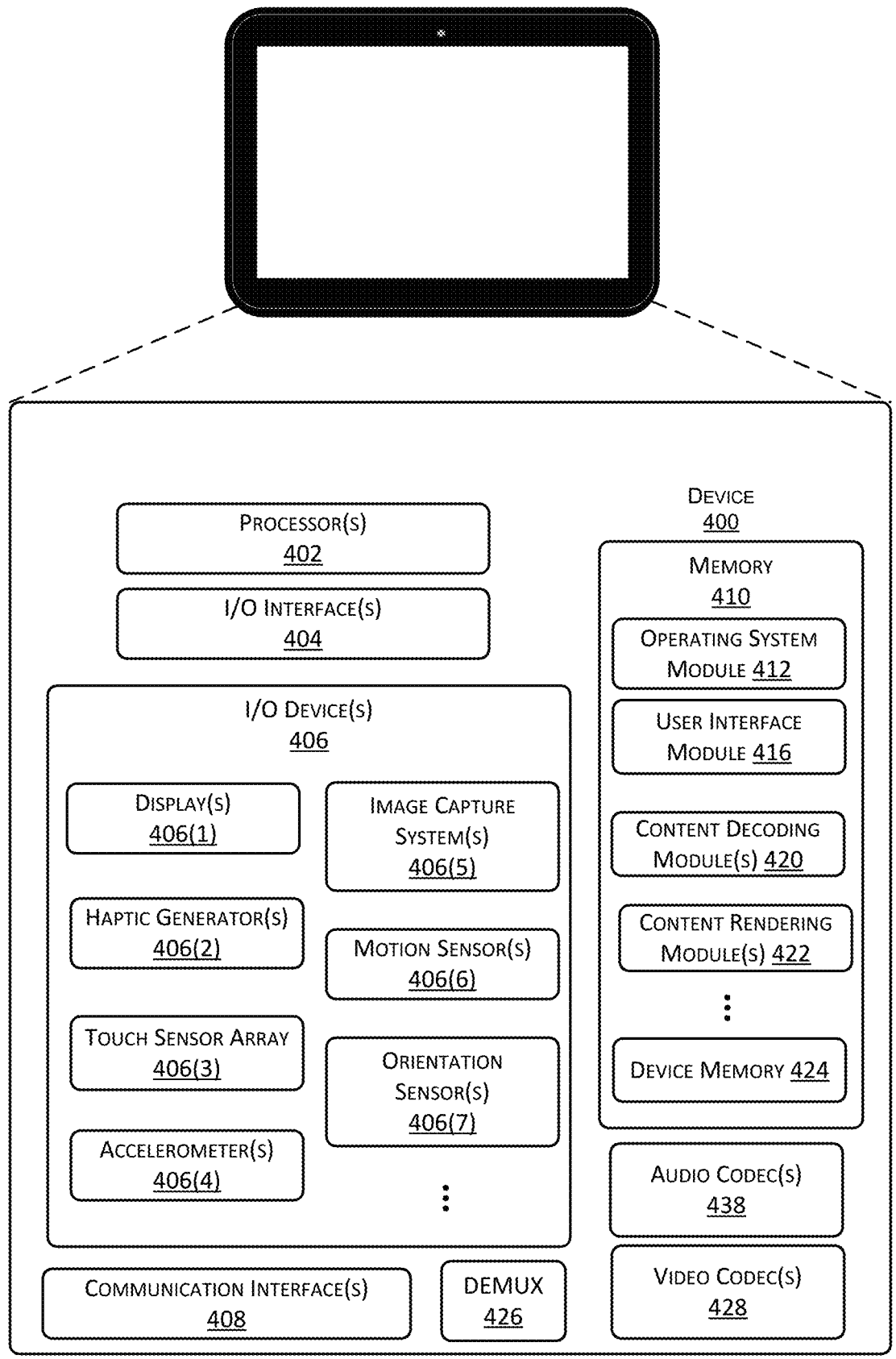
FIG. 4 is a simplified diagram of an example of a client device that may be used with various implementations.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), one or more microphones, and/or one or more speakers.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 can also include additional modules such as a user interface module 416, a content rendering module 422, and/or other modules that facilitate communication with services offered by computing system 300.

Client device 400 can further include a demultiplexer (DEMUX) 426 that demultiplexes frames of fragments and passes the demultiplexed frames to a decoder for decoding. Each decoder may be implemented software and/or hardware.

Client device 400 can support a variety of video encoding standards. For some video encoding standards, decoding can be performed by a content decoding module 420. For other video encoding standards, decoding can be performed by a corresponding video codec 428 that includes hardware (e.g., electrical components or a circuit) configured to decode frames of video content files according to a corresponding video encoding standard such as H.264 or H.265.

In some implementations, client device 400 can support a variety of audio encoding standards such as Pulse-Code Modulation (PCM), MP3, and/or Advanced Audio Coding (AAC). For some audio encoding standards, decoding can be performed by a content decoding module 420. For other audio encoding standards, decoding can be performed by a corresponding audio codec 438 that includes hardware (e.g., electrical components or a circuit) configured to decode compressed audio content.

In some implementations, client device 400 includes a voice service module configured to communicate with a voice service, as described herein. In addition, voice service module may be configured to process an utterance. More particularly, voice service module may be configured to convert an utterance to text using speech recognition and/or natural language processing. Voice service module may also be configured to parse and process the text to identify a voice command and any associated parameters. Voice service module may be further configured to send a message including or identifying a voice command to the voice service.

Client device 400 can also include a GPS receiver that transmits a GPS signal. The GPS signal may be used by computing system 300 to identify GPS coordinates of client device 400.

In some implementations, content rendering module(s) 422 renders images that are generated as a result of decoding frames. In some implementations, content rendering module 422 renders audio that may be generated as a result of decoding frames or packets including compressed audio content. For example, content rendering module 422 may render content including images via a display and/or audio content via speaker(s).

Memory 410 also includes device memory 424 to store a wide variety of instructions and information using any of a variety of formats including, for example, flat files, databases, linked lists, trees, or other data structures. Such information can include audio content and/or content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the decoding of compressed audio content or video content (e.g., frames) of video files may be implemented in a variety of ways. For example, at least some of this functionality may be implemented as part of the code of a media player operating on device 400. Alternatively, content rendering module 422 may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other devices types may also be used (e.g., as represented by devices 306-1 to 306-5 and/or devices 307-1 to 307-5). The scope of this disclosure should therefore not be limited by reference to device-specific details.

Figure 5:
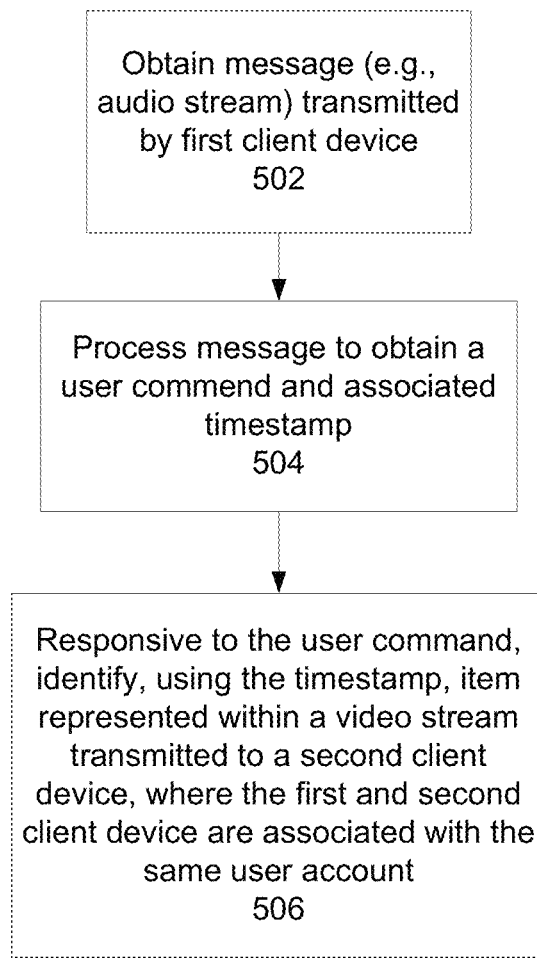
FIG. 5 is a flowchart illustrating operation according to various implementations.

The processing of a voice request in relation to an item seen within a video according to a particular implementation is illustrated in the flow chart of FIG. 5. As shown in FIG. 5, a computing system that offers services including the voice service and content service obtains (e.g., receives) a message transmitted by (e.g., from) the first client device (502). As described herein, the message may include an unprocessed utterance or results of processing the utterance. The message may include an audio stream, frame, or packet. The computing system processes the message to obtain a user command and associated timestamp (504). For example, the computing system may process an audio stream including a voice command using various techniques such as speech recognition and natural language processing.

Responsive to the user command, the computing system identifies, using the timestamp, an item represented within a video stream transmitted to a second client device, where the first and second client device are associated with the same user account (506). In some implementations, the computing system identifies the relevant content within the video stream using the timestamp and determines an item represented within the content.

Content can include, but is not limited to, a content item such as a television show or movie, a fragment of the content item that corresponds to a particular segment of time, an advertisement, or a frame of the content item. The content and/or item may be identified using various techniques based upon information such as audio data of the video stream, frame(s) or fragments or the video stream, metadata of the video stream, and/or information external to the video stream, as will be described in further detail below with reference to FIG. 6

The content and/or item may be identified based, at least in part, upon a time or approximate time that the content was rendered by or transmitted to the second client device. For example, the computing system may determine which content was rendered by or transmitted to the second client device at a time that is equal to the timestamp, at a time that is approximately equal to the timestamp, or at a time within a range of time values that includes the timestamp or is otherwise determined based upon the timestamp. The range of time values may be static or dynamic. For example, the range of time values may be generated such that it includes and/or is based upon the timestamp. The range of time values may include times that occur prior to and/or after the timestamp.

After the item is identified, the computing system may store information pertaining to the item. For example, the information pertaining to the item may be stored in association with an order for the item within account information of the user account. The computing system may facilitate fulfillment of the order by shipping or transmitting the item or, alternatively, communicating with a third-party service to provide the requested item.

Figure 6:
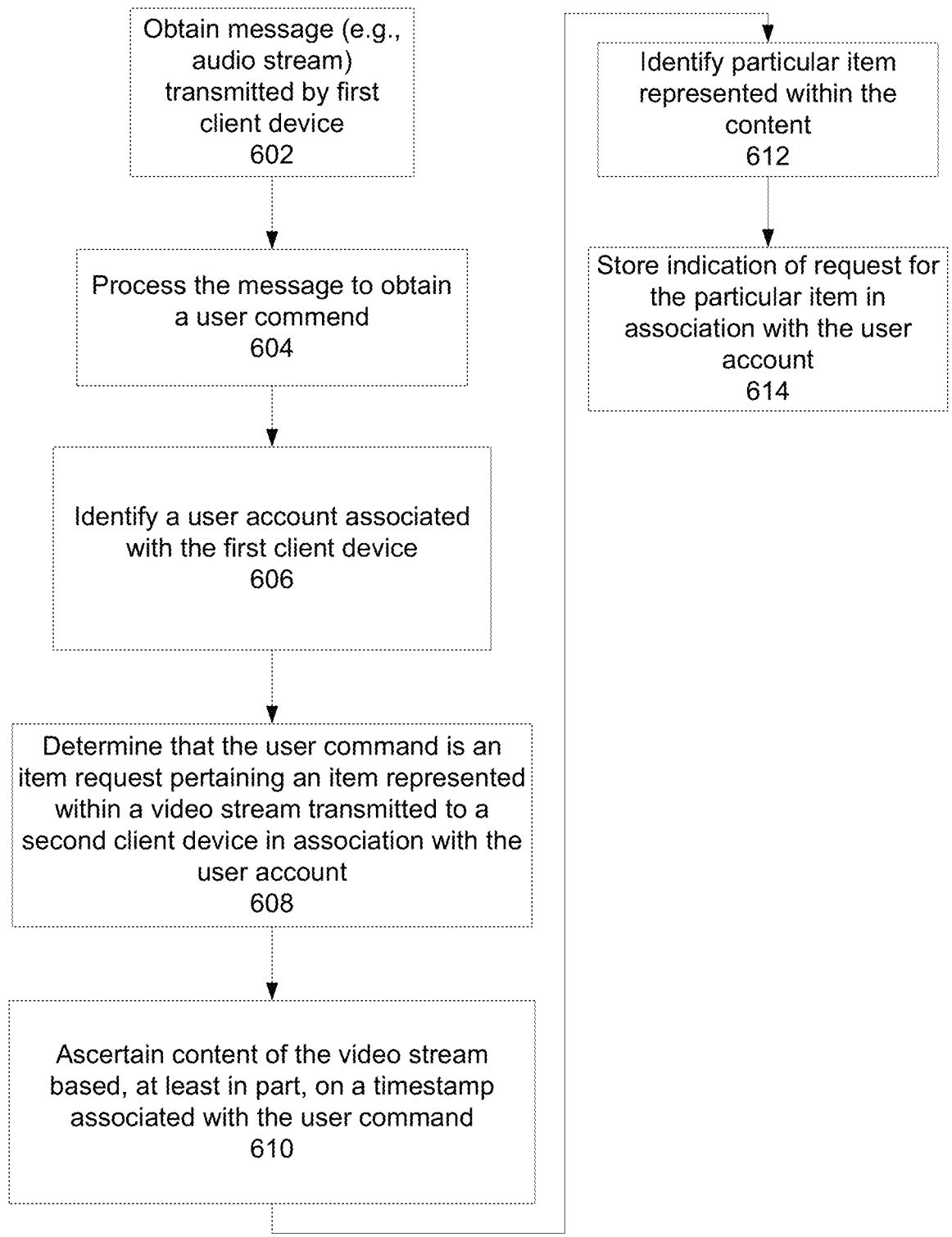
FIG. 6 is a flowchart illustrating operation of a particular implementation.

FIG. 6 is a flowchart illustrating operation of a particular implementation that enables voice requests for items seen within video to be fulfilled. Video can include VOD or live content. It will be understood that the basic principles described herein may be employed with any of a variety of video and audio codecs including, for example, MPEG-1, MPEG-2, MPEG-4 Part 2, VC-1, H.263, H.264, H.265, VP8, VP9, and Daala.

When a user wants to connect with a content service using a client device, the connection is typically achieved through some kind of login process to a user account of the content service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. Content may be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

When media content is selected in a user interface on a client device, a request for the content is sent to the corresponding content service. The content service provides the client device with the information the client device needs to acquire a stream of the content. This may include, for example, DRM licenses, a decryption key, content metadata, and information about where the client device can request the fragments of the selected content at various resolutions (e.g., a manifest). The client device then acquires a stream of video content using the information received from the content service.

In some instances, multiple devices may be used in association with a user account. For example, user(s) may login to the content service via two different devices, and select two different video content items from the content service via these devices. Thus, the content service may stream video content items to multiple client devices associated with the same user account. The streaming of these video content items may overlap in time.

The content service may store information in the user account that identifies the media content item selected by the user in association with the client device (e.g., client identifier) via which the media content item was selected. In addition, the content service may maintain additional information such as a timestamp that indicates a time that a stream or fragment of the media content was requested or acquired. The timestamp associated with a fragment requested by a client device will likely differ from the time the fragment is actually rendered and displayed by the client device, but may otherwise be suitable for purposes of determining a reliable approximation of the actual time that the fragment is played by a media player of the client device.

To connect with a voice service such as Alexa, the user may login to their user account on a first client device configured to support voice technology implemented by the voice service. While a video is streamed by the content service to a second client device, the user may receive a prompt that indicates that the item can be purchased using a voice command. For example, the prompt may include an audio indicator such as a sound, word, or message. As another example, the prompt may include a visual indicator such as an image, subtitles, closed captions, or a text message. The prompt may be received via the second client device, the first client device, and/or another client device such as a smart phone or other mobile device. The prompt may be transmitted by the content service, voice service, the first client device, the second client device and/or another computing system based, at least in part, on a tag or other metadata associated with the video.

While watching the video, the user may decide to order an item that they see within the video. The user utters a voice command that is received by the first client device. For example, the user may utter a short and simple phrase such as "Buy it" or "Order it." The first client device transmits a message including or otherwise identifying the voice command to a computing system that provides the voice service. More particularly, the message may include an unprocessed audio stream that includes the voice command or may include results of processing the voice command, as described herein. The message may include an audio stream, a frame, or a packet.

Referring now to FIG. 6, a computing system that offers the voice service and content service obtains (e.g., receives) a message transmitted by (e.g., from) the first client device (602). The voice service of the computing system processes the message to obtain a user command and any associated parameters (604). Processing the message can include parsing the message to obtain the user command and any associated parameters. In some instances, the voice service may use speech recognition and natural language processing to convert a voice command to a text user command that can be recognized by the computing system. As will be described in further detail below, the command indicates a request pertaining to video content obtained or streamed from the content service.

In addition, the voice service of the computing system may obtain further information from the message. In some implementations, the voice service obtains a device identifier associated with the first client device and a timestamp associated with the user command from the message. In addition, the voice service may obtain location information from the message, where the location information indicates a location of the first client device.

The computing system may identify a user account associated with the first client device from which the voice command was received (606). For example, the computing system may look up the device identifier of the first client device in a database storing user account information pertaining to a plurality of user accounts. By identifying the user account associated with the first client device, the computing system may ascertain video content being streamed to client device(s) in association with the user account.

The computing system may determine based, at least in part, on account information associated with the user account and the user command, that the user command is an item request pertaining to an item represented within a video stream transmitted to a second client device in association with the user account, where the user command does not identify a particular item being requested (608). More particularly, the voice service may look up the user command (e.g., voice command or associated text) in a database that includes a list of commands recognized by the voice system. The voice service or associated computing system may identify, based upon the lookup of the user command in the database, a corresponding set of computer-readable instructions and execute the set of computer-readable instructions.

The user command may indicate a request for an item represented within video content transmitted to a client device associated with the user account, but does not identify the video content or the client device to which the video content is being/has been transmitted. During execution of the set of computer-readable instructions, the computing system may identify any video streams currently and/or recently transmitted to device(s) associated with the user account. The computing system may use the timestamp to identify a single video stream where multiple streams are identified. More particularly, the computing system may identify a video stream for which transmission of at least a portion of the video stream occurred during a time equal to, approximately equal to, or within a time range from or including the timestamp. In this example, the computing system identifies, using account information associated with the user account, a video stream that has been or is being transmitted from a content service of the computing system to a second client device in association with the user account.

In some instances, the computing system may determine, using the account information associated with the user account, that video content item(s) are being and/or have recently been streamed from the content service of the computing system to multiple devices in association with the user account. Where video content item(s) are being/have recently been streamed to multiple client devices in association with the user account, the computing system may identify the client device that is closest to the first client device from which the voice command was received. More particularly, to identify the media content that is relevant to the user command, the computing system may determine, based upon locations of the client devices to which media content has been/is being streamed from the content service and a location of the first client device, that the second client device is closest to the first client device from which the voice command was received.

The locations of the first client device and the client devices to which media content has been/is being streamed may be ascertained from location information such as IP addresses of the client devices (e.g., obtained during the log in process) or GPS locations of the client devices. The location information associated with the first client device and/or client device(s) to which media content has been/is being streamed may be received from or otherwise obtained by the computing system according to a variety of techniques. More particularly, the location information may be pushed to the computing system from a client device, may be obtained by the computing system from a header of a request received from the client device, or may be received in response to querying the client device.

After identifying the video stream, the computing system determines which portion of the video stream was seen by a user of the second client device at the time that the command was uttered by the user. More particularly, the computing system may ascertain content of the video stream based, at least in part, on a timestamp associated with the user command (610). In other words, the relevant portion of the video may be identified based upon the time that the command was uttered. The content can include, for example, a video content item, a fragment of a video content item, a frame of a video content item, or an advertisement. The timestamp may be obtained from the message (e.g., frame, packet, or audio stream) or may represent a time that the voice command was received by the voice service from the first client device. The computing system may identify the content using information maintained in association with the user account such as timestamps associated with request or transmission of the video or portion thereof, a bit rate at which the video or portion thereof was transmitted, and/or approximate or actual delay time corresponding to any portions of the video stored in a buffer at the second client device. In addition, the computing system may identify the content using information maintained in association with the requested/transmitted content. For example, the computing system may use information such as a size of a video content file or portion thereof, segments of time corresponding to fragments of the video content or commercial breaks, etc. In this manner, the computing system may ascertain which content was being viewed on the second client device at the time that the user uttered the voice command.

The content of the video stream may originate from the computing system or from a third party service. Generally, where the content of the video stream originates from the computing system, the computing system may identify the content by analyzing metadata associated with the video stream (or content thereof) as maintained within the user account, in file(s) storing the content, and/or in metadata otherwise associated with the content. For example, a timestamp associated with a request for a particular video content item or fragment thereof, a timestamp associated with a receipt of the request by the computing system, and/or a play time duration associated with the requested video content item or fragment may be used to determine which frame(s) and corresponding item the user was viewing at the time that the command was uttered. As another example, a content identifier such as a title of a television show or episode of a television show may be identified from file(s) storing the content, information maintained within the user account, and/or information maintained in a library that stores content items. However, where the content of the video stream originates from a third party service, the computing system may not be able to easily identify the content of the video stream that is/was viewed at the time that the command was uttered.

The computing system may identify the content of the video stream that is/was viewed at the time that the command was uttered using information within the content and/or metadata associated with the content. Information within the content that is used to identify the content can include audio data within the content and/or video data within the content. For example, the computing system may match the audio data to an audio fingerprint associated with a particular television show. As another example, the computing system may use image recognition to identify the content of the video stream. The computing system may also analyze subtitles and/or closed captions associated with the content to identify a relevant content item or portion thereof. For example, a subtitle or closed caption may indicate a title of the content item (e.g., title of a television show, season of the television show, and/or episode of the television show) and/or relevant portion of the content item.

The computing system may then identify a particular item represented within the content of the video stream transmitted to the first client device in association with the user account (612). More particularly, the computing system may identify the particular item that is represented within the content and available for request from the computing system. The particular item may include a physical product, digital product, or a service.

The item represented within the content may be identified using information that is internal within the content and/or external to the content. In some implementations, mappings within a database associate each one of a plurality of content items with one or more corresponding items. For example, to identify the item represented within the content, the computer system may look up an identifier of a content item including the content in the database. In some implementations, a mapping may associate an item with both a content item and a timestamp. In some implementations, the item represented within the content may be identified based upon metadata associated with or within the content. More particularly, the item may be identified based, at least in part, on metadata within the video stream or associated file. For example, the metadata can indicate presence of an audio or visual prompt pertaining to the item or otherwise indicate that the item represented within the content is available for purchase from the computing system by uttering a voice command. In some implementations, audio or video data within the content may be analyzed to identify the item represented within the content. For example, image recognition may be used to identify the item represented within the content. In some implementations, subtitles or closed captions associated with the content may be processed to identify the item represented within the content.

In some instances, the command uttered by the user may include additional information that can be used to identify the item or pertinent content. For example, the command may indicate a type of item represented within the video, a time that the item was shown within the video, and/or a pertinent time period during which the item was shown within the video. For example, the user may utter a command such as "Buy the watch" or "Buy the hat from 10 minutes ago." This additional information within the command may be used as parameters to identify the content rendered at the indicated time and/or item represented within the content.

In some instances, the user command may indicate an individual for which the item is being ordered. For example, the user command may include a phrase such as "Buy it for John." The computing system may ascertain John's identity from sources such as the user account of the user, contacts of the user in social network(s), and/or contact information within a digital phone book of the user. For example, the computing system may determine that the name "John" refers to the individual John Johnson. The computing system may look up further information associated with John Johnson in sources such as the digital phone book of the user or a user account of John Johnson maintained by the system. In this manner, the computing system may look up information such as the mailing address of the individual and/or product preferences of the individual such as a preferred size or color.

In some implementations, the computing system may confirm the intent to request or order the particular item. For example, the voice system may ask the user whether they would like to proceed with purchasing the identified item. In addition, the voice system may confirm details pertaining to the request/order or item, such as the mailing address or individual to whom the item is to be shipped.

The computing system may store an indication of a request (e.g., order) for the particular item in association with the user account (614). More particularly, the computing system may store information pertaining to the request in account data associated with the user account.

In some instances, the user command will correspond to a request to purchase the particular item. To complete the purchase, the computing system may charge a credit card or other form of payment indicated in the account information associated with the user account.

The computing system may facilitate fulfillment of the request using various mechanisms. For example, the computing system may initiate the shipment or delivery of a physical product to an address associated with the user account or transmission of a digital product to a client device associated with the user account. As another example, the computing system may submit an order for the particular item via a third party computing system.

In the above described examples, the utterance pertains to a request for an item. However, these examples are merely illustrative. Thus, rather than requesting the item, the utterance or further utterances may request information pertaining to the item. For example, an utterance may include a phrase such as "How much does it cost?" or "Send more information." The computing system may identify the item as described herein, retrieve the requested information pertaining to the item, and provide the requested information.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    transmitting, by one or more servers, a video stream to a first client device in association with a user account;
    processing, by the one or more servers, a message received from a second client device to obtain a device identifier of the second client device, a user command, and a timestamp associated with the user command;
    determining, by the one or more servers, that the device identifier of the second client device is associated with the user account;
    performing, by the one or more servers, a lookup in a database for the user command;
    ascertaining, by the one or more servers based upon the lookup in the database for the user command, that the user command is a request for an item represented within video content transmitted to another client device associated with the user account;
    determining, by the one or more servers from account information associated with the user account, that the video stream has been or is being transmitted to the first client device in association with the user account;
    ascertaining, by the one or more servers, content of the video stream transmitted to the first client device in association with the user account based, at least in part, on the timestamp;
    identifying, by the one or more servers, a particular item represented within the content of the video stream transmitted to the first client device in association with the user account; and
    storing in association with the user account, by the one or more servers, an indication of a request for the particular item.

2. The method as recited in claim 1, wherein the content of the video stream transmitted to the first client device in association with the user account comprises a video content item, a fragment of a video content item, a frame of a video content item, or an advertisement.

3. The method as recited in claim 1, wherein ascertaining the content of the video stream transmitted to the first client device in association with the user account further comprises:
    identifying the content based, at least in part, on at least one of: audio data within the content, video data within the content, metadata associated with the content, subtitles associated with the content, or closed captions associated with the content.

4. The method as recited in claim 1, wherein identifying the particular item represented within the content comprises one or more of:
    performing a lookup in a database using a content identifier of the content to ascertain one or more items mapped to the content identifier;
    ascertaining, from metadata associated with or within the content, the particular item represented within the content;
    analyzing audio data within the content or video data within the content to identify the particular item represented within the content; or
    processing subtitles or closed captions associated with the content to identify the particular item represented within the content.

5. The method as recited in claim 1, further comprising:
    encoding, by a video codec, a video content item including the content such that the video content item includes an indicator that indicates that the particular item can be requested via a voice command.

6. A system, comprising:
    one or more processors and memory configured to:
        process a message received from a first client device to obtain a user command;
        identify a user account associated with the first client device;
        determine, based at least in part on account information associated with the user account and the user command, that the user command is an item request pertaining to an item represented within a video stream transmitted to a second client device associated with the user account;
        identify a particular item represented within the video stream transmitted to the second client device in association with the user account based, at least in part, on a timestamp associated with the user command; and
        store an indication of a request for the particular item in account information associated with the user account.

7. The system as recited in claim 6, the processors and memory being further configured to identify a particular item represented within the video stream transmitted to the second client device in association with the user account by:
    ascertaining content of the video stream transmitted to the second client device in association with the user account based, at least in part, on the timestamp associated with the user command; and
    identifying the particular item represented within the content.

8. The system as recited in claim 7, wherein the content of the video stream transmitted to the second client device in association with the user account comprises a video content item, a fragment of a video content item, a frame of a video content item, or an advertisement.

9. The system as recited in claim 7, the processors and memory being further configured to identify the particular item represented within the content by:
    performing a lookup in a database using a content identifier of the content to ascertain one or more items mapped to the content identifier;
    ascertaining, from metadata associated with or within the content, the particular item represented within the content;
    analyzing audio data within the content or video data within the content to identify the particular item represented within the content; or processing subtitles or closed captions associated with the content to identify the particular item represented within the content.

10. The system as recited in claim 6, the processors and memory being further configured to:
identify one or more video streams transmitted to one or more client devices associated with the user account, wherein the video streams include the video stream, and wherein the client devices include the second client device.

11. The system as recited in claim 6, the processors and memory being further configured to:
identify two or more video streams transmitted to two or more client devices associated with the user account, wherein the video streams include the video stream, and wherein the client devices include the second client device; and
select one of the video streams based, at least in part, on first information indicating a location of the first client device and second information indicating locations of the client devices.

12. The system as recited in claim 6, wherein the item comprises a physical product, a digital product, or a service.

13. The system as recited in claim 6, the processors and memory being further configured to:
facilitate fulfillment of the request for the item.

14. A method, comprising:
processing, by one or more servers, a message received from a first client device to obtain a user command;
identifying, by the one or more servers, a user account associated with the first client device;
determining, by the one or more servers, based at least in part on account information associated with the user account and the user command, that the user command is an item request pertaining to an item represented within a video stream transmitted to a second client device associated with the user account;
identifying, by the one or more servers, a particular item represented within the video stream transmitted to the second client device in association with the user account based, at least in part, on a timestamp associated with the user command; and
storing in association with the user account, by the one or more servers, an indication of a request for the particular item.

15. The method as recited in claim 14, wherein identifying a particular item represented within the video stream transmitted to the second client device in association with the user account comprises:

ascertaining, by the one or more servers, content of the video stream transmitted to the second client device in association with the user account based, at least in part, on the timestamp associated with the user command; and
identifying, by the one or more servers, the particular item represented within the content.

16. The method as recited in claim 15, wherein the content of the video stream transmitted to the second client device in association with the user account comprises a video content item, a fragment of a video content item, a frame of a video content item, or an advertisement.

17. The method as recited in claim 15, wherein identifying the particular item represented within the content comprises one or more of:
performing a lookup in a database using a content identifier of the content to ascertain one or more items mapped to the content identifier;
ascertaining, from metadata associated with or within the content, the particular item represented within the content;
analyzing audio data within the content or video data within the content to identify the particular item represented within the content; or
processing subtitles or closed captions associated with the content to identify the particular item represented within the content.

18. The method as recited in claim 14, further comprising:
identifying one or more video streams transmitted to one or more client devices associated with the user account, wherein the video streams include the video stream, and wherein the client devices include the second client device.

19. The method as recited in claim 14, further comprising:
identifying two or more video streams transmitted to two or more client devices associated with the user account, wherein the video streams include the video stream, and wherein the client devices include the second client device; and
selecting one of the video streams based, at least in part, on first information indicating a location of the first client device and second information indicating locations of the client devices.

20. The method as recited in claim 14, wherein the message comprises an audio stream, a frame, or a packet.

* * * * *